United States Patent
Schonfeld et al.

(10) Patent No.: US 7,095,786 B1
(45) Date of Patent: Aug. 22, 2006

(54) OBJECT TRACKING USING ADAPTIVE BLOCK-SIZE MATCHING ALONG OBJECT BOUNDARY AND FRAME-SKIPPING WHEN OBJECT MOTION IS LOW

(75) Inventors: Dan Schonfeld, Glenview, IL (US); Karthik Hariharakrishnan, Chicago, IL (US); Philippe Raffy, Sunnyvale, CA (US); Fathy Yassa, Soquel, CA (US)

(73) Assignee: Neo Magic Corp., Santa Clara, CA (US)

( * ) Notice: Subject to any disclaimer, the term of this patent is extended or adjusted under 35 U.S.C. 154(b) by 778 days.

(21) Appl. No.: 10/248,348

(22) Filed: Jan. 11, 2003

(51) Int. Cl.
*H04N 7/12* (2006.01)

(52) U.S. Cl. .................. 375/240.16; 382/236

(58) Field of Classification Search .......... 375/240.08, 375/240.09, 240.24, 240.16; 382/236, 300, 382/190, 243, 242, 256, 234
See application file for complete search history.

(56) References Cited

U.S. PATENT DOCUMENTS

| | | | |
|---|---|---|---|
| 5,635,986 A | 6/1997 | Kim ............................. 375/240 |
| 5,936,671 A | 8/1999 | Van Beek et al. ........ 375/240.14 |
| 5,940,538 A | 8/1999 | Spiegel et al. ............... 382/286 |
| 5,946,043 A * | 8/1999 | Lee et al. ............... 375/240.24 |
| 6,075,875 A | 6/2000 | Gu ............................... 382/107 |
| 6,137,913 A | 10/2000 | Kwak et al. ................. 382/236 |
| 6,169,573 B1 | 1/2001 | Sampath-Kumar et al. . 348/169 |
| 6,192,156 B1 | 2/2001 | Moorby ....................... 382/286 |
| 6,236,680 B1 | 5/2001 | Chun et al. ............. 375/240.01 |
| 6,272,253 B1 * | 8/2001 | Bannon et al. ............. 382/236 |
| 6,298,170 B1 | 10/2001 | Morita ........................ 382/278 |
| 6,335,985 B1 * | 1/2002 | Sambonsugi et al. ....... 382/190 |
| 6,337,917 B1 | 1/2002 | Onural et al. ............... 382/107 |
| 6,389,168 B1 | 5/2002 | Altunbasak et al. ........ 382/224 |
| 6,393,054 B1 | 5/2002 | Altunbasak ................. 375/240 |
| 6,400,846 B1 | 6/2002 | Lin et al. .................... 382/199 |
| 6,424,370 B1 | 7/2002 | Courtney .................... 348/143 |
| 6,625,333 B1 * | 9/2003 | Wang et al. ................. 382/300 |

OTHER PUBLICATIONS

D. Schonfeld and D. Lelescu, "VORTEX: Video retrieval and tracking from compressed multimedia databases-multiple object tracking from MPEG-2 bitstream," *Journal of Visual Communications and Image Representation*, Special Issue on Multimedia Database Management, vol. 11, pp. 154-182, 2000 (50pp).

* cited by examiner

*Primary Examiner*—Gims Philippe
(74) *Attorney, Agent, or Firm*—Stuart T. Auvinen

(57) ABSTRACT

An object in a video sequence of frames is tracked by object masks generated for frames in the sequence. Macroblocks are motion compensated. Blocks matching entirely within a prior-frame object mask are used to generate an average object motion. When the average motion is below a motion threshold, frames are skipped at larger intervals, but more frequent frames are processed when high motion occurs. When the macroblock best matches a prior-frame block that has the object's boundary passing through the block, the macroblock is uncertain and is sub-divided into smaller sub-blocks that are again motion compensated. Sub-blocks matching blocks within the object mask in the base frame are added to the new object mask for the current frame while sub-blocks matching a block containing the object boundary are uncertain and can again be sub-divided to further refine the object boundary. Frame skipping and adaptive-size blocks on the object boundary reduce computational load.

19 Claims, 11 Drawing Sheets

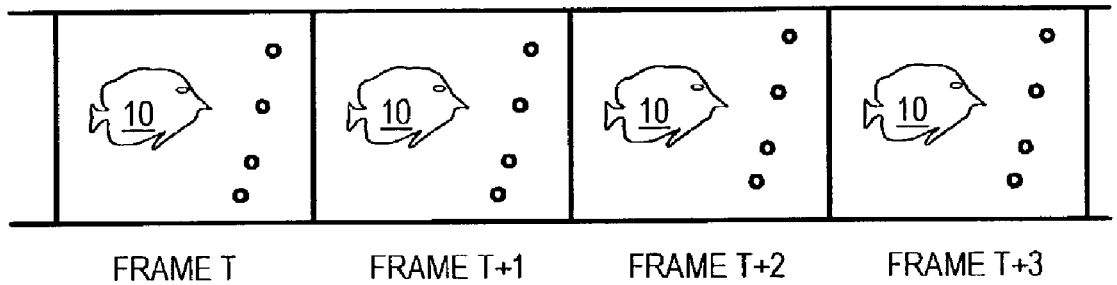
LOW MOTION FIG. 2A
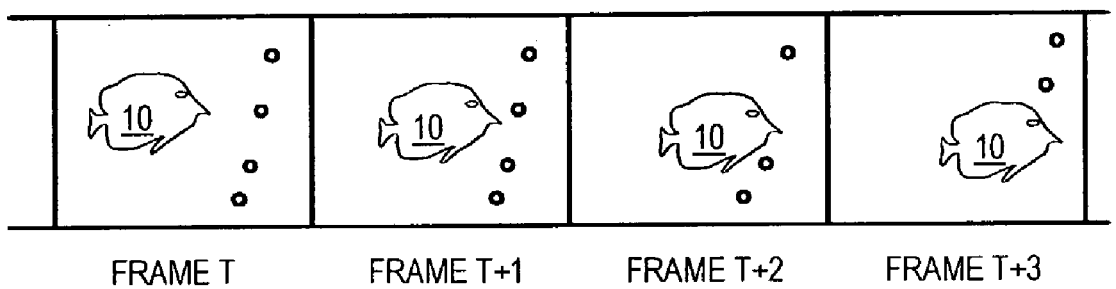
HIGH MOTION FIG. 2B

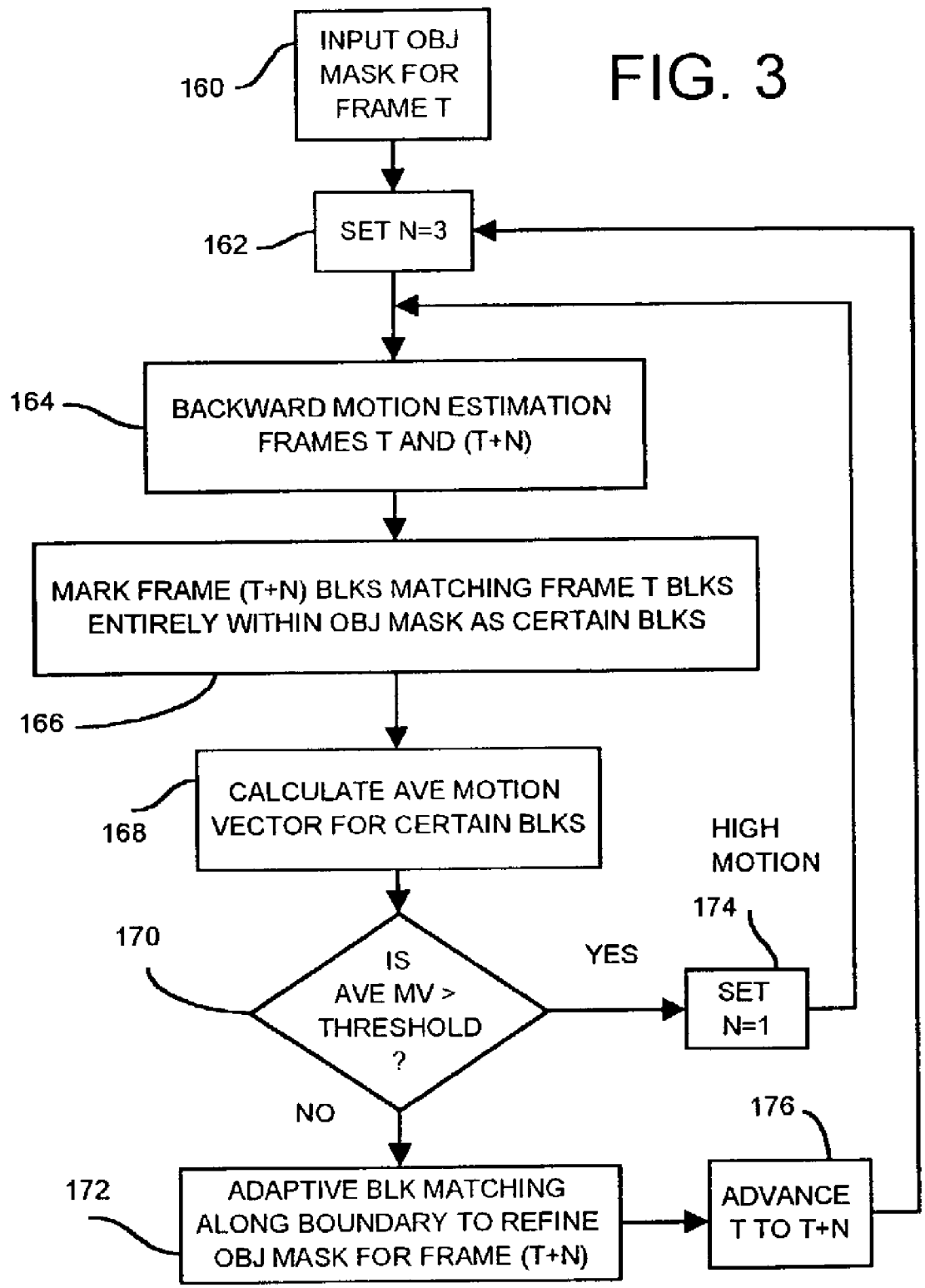

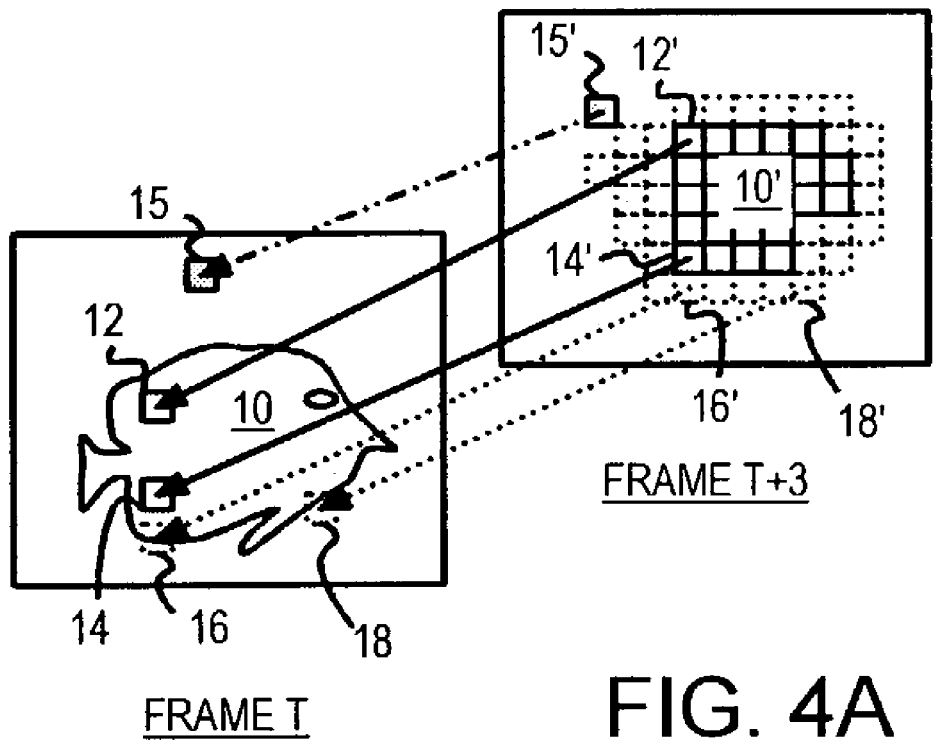
FIG. 4A
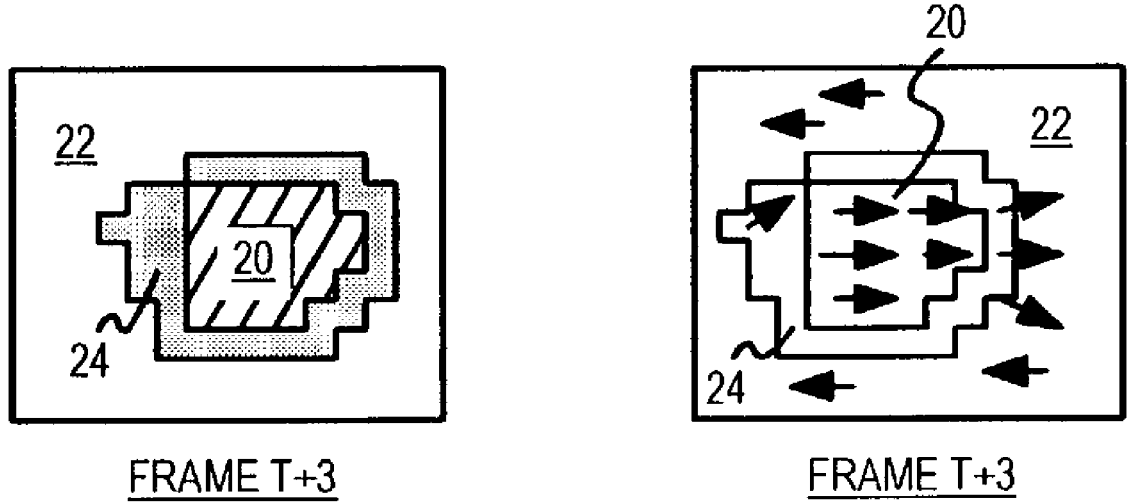
FIG. 4B
FIG. 4C

OBJECT TRACKING USING ADAPTIVE BLOCK-SIZE MATCHING ALONG OBJECT BOUNDARY AND FRAME-SKIPPING WHEN OBJECT MOTION IS LOW

BACKGROUND OF INVENTION

This invention relates to image processing, and more particularly to object tracking and contour prediction in a video sequence.

Greatly increasing computing power allows for vastly more complex calculations to be performed on data. Video sequences can be analyzed or operated upon by fast yet cheap processors. The many frames of still images making up a video sequence can be compressed using motion vectors using the well-known motion-picture-experts group (MPEG) compression standards.

Computational algorithms can be used to detect foreground objects and follow these foreground objects around in the video sequence. Knowledge of the locations of such foreground objects, even imperfect guesses, can improve compression since more resources can be allocated to the foreground objects than to the background.

For example, a still image or a video sequence captured by a hand-held device such as a smart cell phone may be operated upon by a cheap yet powerful processor in the phone to compress the image, reducing the bandwidth required to wirelessly transmit the video. With sufficient computational power, more complex operations may be performed on the image, such as detecting foreground objects. Then the video compression can be improved by allocating more bandwidth for transmission of the foreground object while reducing bandwidth allocated to transmit the background.

Video surveillance applications may use processors to detect moving objects in video frames captured by a surveillance camera. The processors may follow these moving objects, perhaps drawing a contour or bounding box around the object in each frame and then allocating additional memory storage for the object, essentially allowing for a higher resolution of the moving object than for the background. When the object is a person or a car, the higher resolution may allow for the person's face or the car's license plate to be extracted from the video sequence.

Video archives can be processed in a similar manner by software that detects foreground or moving objects, and draws bounding boxes or contours around the object in each frame of the video sequence. Cataloging software could then list which frames the object is in, and which frames the object is absent from.

FIGS. 1A–B show a video sequence with tracking of the contour of a foreground object. In FIG. 1A, foreground object 10 is moving slowly to the right in frames T to T+3. In this example foreground object 10 is a fish that may be obscured by other objects such as bubbles or other fish.

Various algorithms exist that allow a computer or processor to extract the location of object 10 in frame T. For example, segmentation or watershed analysis can determine the contour or boundary of object 10 by the rapid change in color at the perimeter of object 10, which might be a yellow fish while the background is blue water. Contour 11 of object 10 can be extracted as points along a line having a maximum gradient or change in color between the fish and the water. Similar contour extractions could be performed for subsequent frames T+1, T+2, and T+3 to generate contours 11', 11", and 11'" of FIG. 1B that track object 10 in these frames.

Contours 11, 11', 11", and 11'" can be line segments along the object perimeter, or pixels along the perimeter, or can be defined in other ways. For example, the area within the contour may be stored as an object mask, either including the perimeter or excluding the perimeter, or all pixels within the object's predicted contour can be stored.

Other contour-prediction or object-tracking methods have been proposed, such as a "snakes" method and a mesh-based method that track points along the object boundary in subsequent video frames. However, these methods generally require significantly large and complex computations that may prevent real-time processing, since the computations can take more time on a processor than the video takes to capture, view, or transmit. Errors may occur when processing frames takes too long.

While such object tracking methods are effective in various situations, most are computationally expensive. What is desired is a less computationally expensive method of object tracking.

BRIEF DESCRIPTION OF DRAWINGS

FIGS. 2A–B illustrate object tracking when the object is moving slowly and more rapidly.

FIG. 3 is a simplified flowchart highlighting modulation of object tracking.

FIGS. 4A–C show motion estimation to detect certain and uncertain blocks, and the average motion for the certain blocks.

DETAILED DESCRIPTION

Figure 1A:
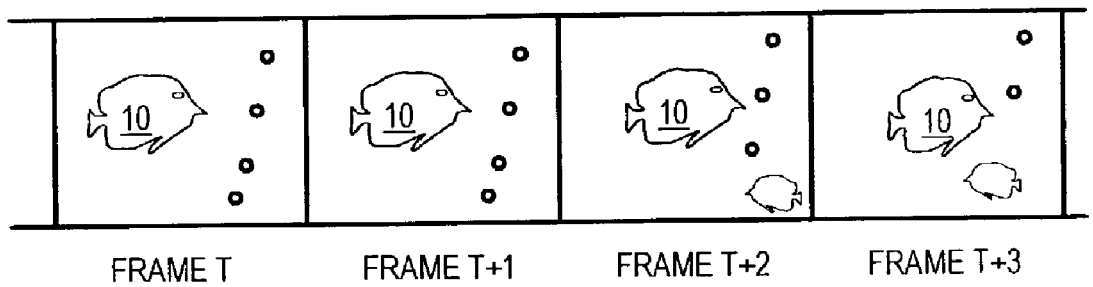
FIGS. 1A–B show a video sequence with tracking of the contour of a foreground object.
Figure 1B:
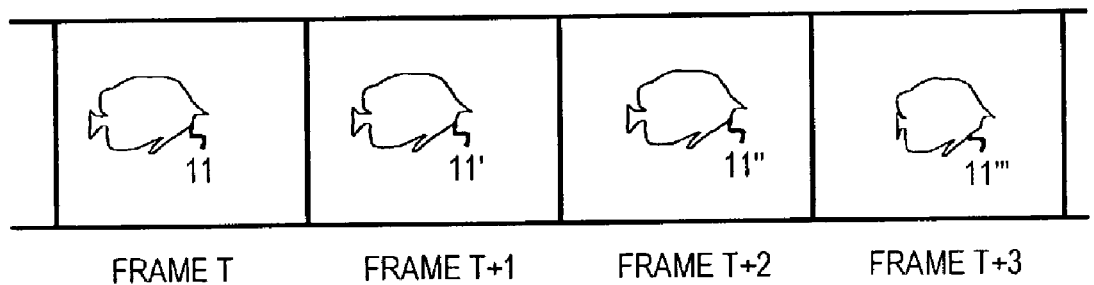

The present invention relates to an improvement in object tracking. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that some video sequences are more complex and difficult to track objects in than others. For example, when an object moves quickly, tracking the object is more difficult. The object tracks may speed up for some frames in the video sequence, but slow down for other frames. The inventors desire to modulate the tracking method to minimize computational work while accurately tracking both fast objects and slow objects.

FIGS. 2A–B illustrate object tracking when the object is moving slowly and more rapidly. In FIG. 2A, object 10 is moving very slowly in frames T to T+3. However, in FIG. 2B, object 10 moves rapidly to the right during the four-frame sequence. Such high object motion of FIG. 2B can be more difficult to track than the slow object motion of FIG. 2A.

Object 10 is tracked frame-by-frame when motion is high, but is tracked less frequently when object motion is low. For example, when the motion of object 10 is above a threshold, high motion is detected and object 10 is tracked for each frame. However, when the motion of object 10 is below the threshold, slow motion is occurring and object 10 is tracked every third frame. During slow motion, two frames are skipped for every frame that the object is tracked. For example, object 10 can be tracked and its contour predicted for frame T and three frames later for frame T+3, while the contour of object 10 is not predicted for skipped frames T+1 and T+2.

The object tracking is thus modulated to track frame-by-frame during high motion, but track every third frame when motion is low. This modulation reduces computations by up to two-thirds for slow-moving objects, but still accurately tracks fast-moving objects.

FIG. 3 is a simplified flowchart highlighting modulation of object tracking. The object-tracking method is a block-based tracking method that uses macroblocks and motion vectors such as are used in MPEG compression. Macroblocks in a current or new frame T+N are compared to blocks in a first frame T to find a best-matching block, and the displacement between the blocks in frames T and T+N is the motion vector for the block. Errors or differences between the block in frame T+N and frame T do not have to be calculated for object tracking itself, although error terms are calculated by compression methods.

The initial object mask for frame T is input, step 160. A user can manually draw a contour around the object, such as by clicking with a mouse at points along the boundary of the desired object, and the computer or processor can connect these points to generate the initial contour or object mask. Alternately, an automated method can be used, such as a segmentation or watershed algorithm. This initial contour generation only has to be performed once, for the first frame (T=1) in the video sequence being processed, or for the first frame that the object appears in. Contour generation can also be performed intermittently to reinitialize the object contour and minimize error propagation.

The parameter N is the frame-modulation number, or the number of frames to skip ahead to. Object tracking is performed every N frames. When N=1, object tracking is performed every frame, while when N=3 object tracking is performed every third frame, and two frames are skipped. N is set to 3 when slow motion is detected, but set to one when high motion is detected.

Initially, the frame-modulation parameter N is set to 3, step 162. Backward motion estimation, step 164, is performed between new frame T+N and first frame T. Each macroblock in frame T+N is compared to a range of macroblocks in frame T to find the closest matching macroblock in frame T. A sum-of-absolute differences or least-variation of the YUV or other pixel color can be used to determine how well the blocks match. The displacement between the macroblock in frame T+N and the best-matching macroblock in earlier frame T is the motion vector for the macroblock in frame T+N.

Motion vectors for all macroblocks in frame T+N can be generated in step 164. The search range may be restricted, such as to a range of 32 pixels in any direction, or the entire frame T can be searched.

The location of each best-match block in frame T is compared to the object contour of frame T to determine if the best-matching block is within the object or outside the object or along the contour or boundary itself. Blocks along the boundary are specially processed by adaptive block sizes as described later.

Blocks in frame T+N that match a frame T block that is entirely within the initial object mask or contour and referred to as "certain" object blocks. Blocks in frame T+N that match a block in frame T that is entirely outside the initial object contour are also "certain" blocks, but are background blocks. Blocks in frame T+N that best match a block that includes the object boundary are referred to as "uncertain" blocks.

In step 166, the certain object blocks are marked. These are blocks in frame T+N that best match a block in frame T that is completely within the initial object contour of frame T. These certain object blocks form "seed" blocks that are within the object mask that is being generated for frame T+N.

The average motion of the certain object blocks is computed, step 168. The motion vectors for the certain object blocks can be averaged to generate this average motion, or a more complex averaging method such as an affine model can be used to calculate the average motion. However, only the certain object blocks are used when computing the average motion. Motion vectors for uncertain or boundary blocks are not used when computing this average motion of the object. Ignoring the boundary blocks often produces a more accurate estimate of the object's motion, since the edges of the object can change due to rotation, twisting, etc. of the object. Also, the boundary blocks may be more difficult to match due to the object's boundary and changing background. Thus using just the certain object blocks entirely within the object produces a cleaner average motion.

The average motion of the object calculated in step 168 is compared to a threshold motion. When the average object motion exceeds this threshold motion, high motion is said to occur, step 170. Then the modulation parameter N is reset to 1, step 174, and motion estimation and average-motion calculation (steps 164–168) are repeated for the next frame T+1. Thus a finer granularity of frames for motion estimation is used when motion exceeds the threshold.

When the average object motion is below the threshold motion, low motion is occurs, step 170. Skipping frames is acceptable since the object is moving relatively slowly.

The location of the object boundary is more precisely determined using adaptive block matching, step 172. The uncertain blocks lying on the object boundary are refined using adaptive block matching. These uncertain blocks are processed further to refine the object boundary for frame T+N. Adaptive block matching sub-divides these boundary macroblocks into smaller-size blocks. Block-matching is performed on these smaller-size blocks. Motion vectors for these smaller blocks are also generated. Adaptive block matching along the object boundary is shown in more detail in FIGS. 5–7.

For low motion, the modulation parameter N remains set to 3. The video is advanced and the process repeated. The first frame T in the method is advanced to frame T+N, step 176. Frame T+N becomes frame T, while frame T+2*N becomes frame T+N as the video is advanced by step 176.

Motion estimation and average-motion calculation (steps 164–168) are repeated for the new initial or base frame and the new current frame T+N.

When N=1, the process flow passes through step 170 to step 172 even when the average motion exceeds the threshold. This is because N=1 is already as slow as possible.

Using frame modulation, a coarser granularity of frames for motion estimation and object tracking is used when motion is below the threshold but a finer granularity of frames for motion estimation and object tracking is used when motion is above the threshold.

FIGS. 4A–C show motion estimation to detect certain and uncertain blocks, and the average motion for the certain blocks. FIG. 4A shows motion estimation for certain and uncertain (boundary) blocks. Macroblocks in frame T+N (T+3) are compared to macroblocks in frame T to find the best-matching macroblock in frame T+3.

The location of the best-matching block in frame T determines the type of macroblock in frame T+3. There are three types:

1.) blocks inside the object are certain blocks
2.) blocks outside the object are background blocks
3.) blocks that have the object's boundary passing through the block are uncertain blocks.

Each block in frame T+3 is categorized based on what type of block best matches in frame T. Block 15' in frame T+3 is categorized as a background block since the best-matching block 15 in frame T is outside the initial object contour for object 10. Block 12' in frame T+3 is categorized as a certain object block since the best-matching block 12 in frame T is inside the initial object contour for object 10 in frame T. Likewise block 14' in frame T+3 is categorized as a certain object block since the best-matching block 14 in frame T is also inside the initial object contour for object 10.

Blocks 16', 18' in frame T+3 is categorized as uncertain blocks since the best-matching blocks 16, 18 in frame T are along the initial object contour for object 10. The boundary of object 10 in frame T passes through blocks 16, 18.

The certain object blocks in frame T+3, such as blocks 12', 14', are shown in solid lines, while the uncertain blocks such as 16', 18' are shown with dashed lines. As the new object mask is being constructed for frame T+3, the certain blocks such as 12', 14' form the beginning or "seed" of the new object mask. The exact location of the boundary of object 10' is not yet known for frame T+3. However, it is relatively certain that the certain object blocks are part of object 10'.

The actual boundary for object 10' is somewhere within the dashed uncertain blocks, but the exact pixel locations of this boundary has not yet been determined for frame T+3. FIG. 4B shows the result of categorizing the blocks of frame T+3 as certain, uncertain, or background. Certain blocks 20 are within the new object mask being generated for frame T+3. Uncertain blocks 24 are along the boundary which has not yet been exactly determined. Background blocks 22 are outside the object. The object boundary is refined as shown later by adaptive-size block matching.

FIG. 4C shows motion vectors for background, certain, and uncertain blocks. Motion vectors for certain blocks 20 generally are uniform in direction and magnitude. Since these blocks typically do not include the boundary or some background pixels, they match well and have little error in their motion vectors.

Background blocks 22 often have many errors in their motion vectors, since the background may have little motion or a variety of motions. Also, the background blocks may lack differentiating features. The lack of such variations may result in aliasing, where a background block 22 matches many other blocks. For example, the water may be a relatively uniform blue without distinguishing features. A blue background block may match many other background blocks, resulting in errors in the background motion vectors.

Since uncertain blocks 24 often include some background pixels and some object pixels, finding good matches may be difficult. When the object changes shape due to rotation or z-axis motion, the location of the boundary changes and a match may not be found, or a match found with the wrong block. Thus errors in the motion vectors can occur along the boundary with uncertain blocks 24. More variation in the direction and magnitude of motion vectors is seen for uncertain blocks 24 than for certain blocks 22.

Only certain blocks 22 are used to calculate the average object motion. This reduces errors, since the poorly-matching and changeable uncertain blocks 24 are not included in the average. The motion vectors of certain blocks 22 usually show a lower variance than do the motion vectors of uncertain blocks 24. An average motion that more accurately represents the object's motion is produced.

Figure 5A:
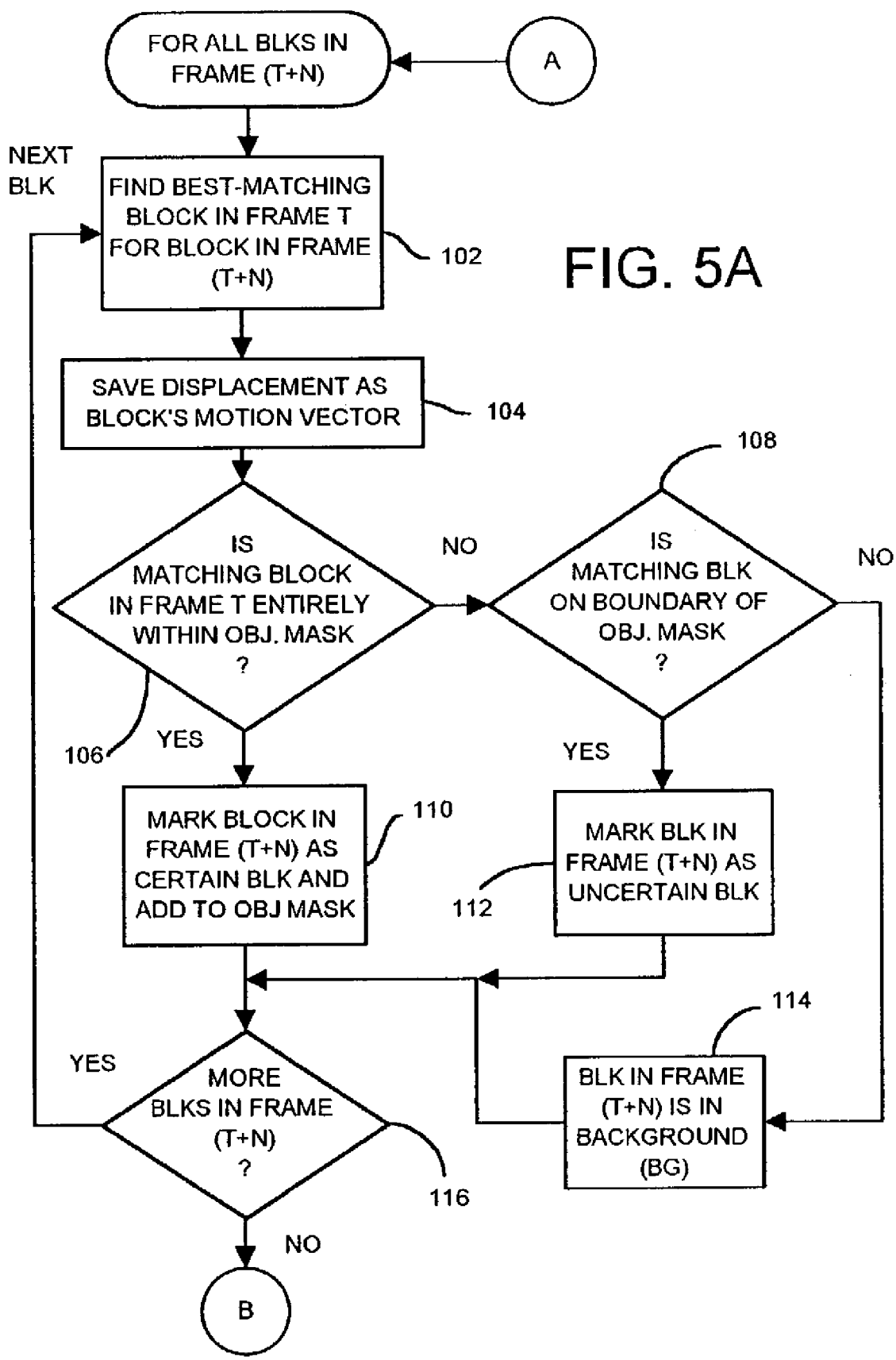
FIGS. 5A–B is a more detailed flowchart of modulated object tracking.
Figure 5B:
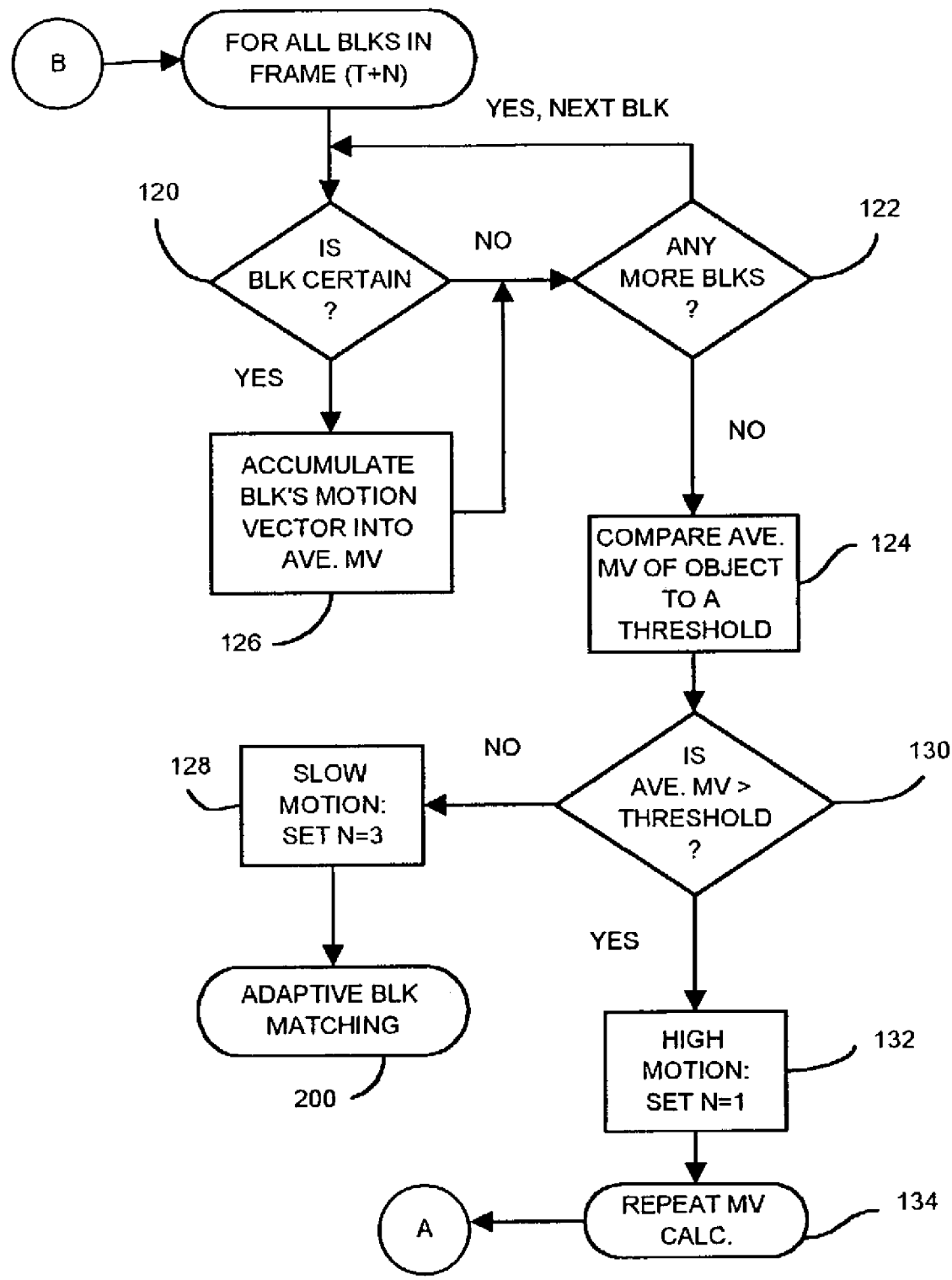

FIGS. 5A–B is a more detailed flowchart of modulated object tracking. FIG. 5A shows motion vector estimation and block categorization (certain, uncertain, background) while FIG. 5B shows calculation of the average motion of the object and selection of the modulation parameter. The procedures in FIGS. 5A–B are repeated for all macroblocks in the new frame T+N.

In FIG. 5A, the new frame T+N is motion compensated and macroblocks in frame T+N are categorized based on the location of the matching macroblock in first frame T. The current macroblock in frame T+N is compared to a range of macroblocks in frame T and the closest matching block is determined. A sum-of-the-absolute difference (SAD) or a sum-of-squared differences method may be used as a measure of the similarity of the YUV or other pixels in the macroblocks being compared in frames T+N and T. The macroblock in frame T with the smallest pixel difference with the current macroblock in frame T+N is the best-matching block.

The search range or search window may be limited (such as a 32 by 32 window) or it may include all macroblocks in frame T. The search granularity is typically much less than the macroblock size, such as just one pixel. This allows the matching macroblock in frame T to not be aligned to the macroblock boundaries in frame T, but to any 16×16 block of pixels.

Once the best-matching macroblock in frame T is found, step 102, the relative displacement between the macroblocks in the two frames is calculated, such as the delta x and delta y values. This displacement is the motion vector for the block, step 104.

The location of the best-matching macroblock in frame T is compared to the object location in frame T. The object contour or object mask is already known for frame T but has not yet been generated for frame T+N. When the best-matching macroblock in frame T is within the object mask, step 106, then the macroblock in frame T+N can be marked as a certain block and can be added to the new object being constructed for frame T+N, step 110. The block can be marked or added to the object mask in a wide variety of ways, such as by setting a bit in a memory, or by adding a pointer, identifier, or address of the block to a list of blocks within the object mask, or by expanding a contour or bound of the object, etc.

When the best-matching macroblock in frame T is not within the object mask, but is along the boundary of the object, step 108, then the macroblock in frame T+N is marked as an uncertain block, step 112. Uncertain blocks are not considered when calculating the average motion, but are further processed by adaptive-size block matching.

When the best-matching macroblock in frame T is outside the object and not on the object boundary, it is marked as a background macroblock, step 114. Background blocks do not have to be physically marked, but can simply be macroblocks that are not marked or listed as certain or uncertain blocks.

When there are more macroblocks in frame T+N, the process of FIG. 5A is repeated, step 116, until all macroblocks have been processed in frame T+N. Then the process flow continues in FIG. 5B.

When a current macroblock in frame T+N being processed is a certain block, step 120, then the macroblock's motion vector is accumulated into an average, step 126. The next block in frame T+N is selected, step 122, and steps 120, 126 repeated until all macroblocks in frame T+N have been processed.

Motion vectors can be accumulated by adding to a running sum and increasing a divisor, and at the end dividing the running sum by the divisor to get the final average motion vector. Alternatively, a moving average can be re-calculated for each new motion vector accumulated, or the moving averages may simply be stored in a list and the average of the listed motion vectors generated at a later time. Separate X and Y averages can be kept, or a combined magnitude, and many other variations are possible.

However, at the end of processing when step 124 is executed, a final average motion vector is available to be compared to a motion threshold, such as 5 pixels of movement. When the average motion vector of the certain blocks of the object exceed the motion threshold, step 132, then high motion exists, and the modulation parameter is set to a low value such as 1. The block-matching and motion estimation of FIG. 5A is repeated for the new frame T+N, such as T+1 rather than T+3, step 134.

When the average motion vector is less than the motion threshold, step 130, then slow or low motion is occurring, step 128, and the modulation parameter can be increased to a higher value such as N=3. The boundary of the object in the new frame T+N is then refined by adaptive block matching 200.

Figure 6A:
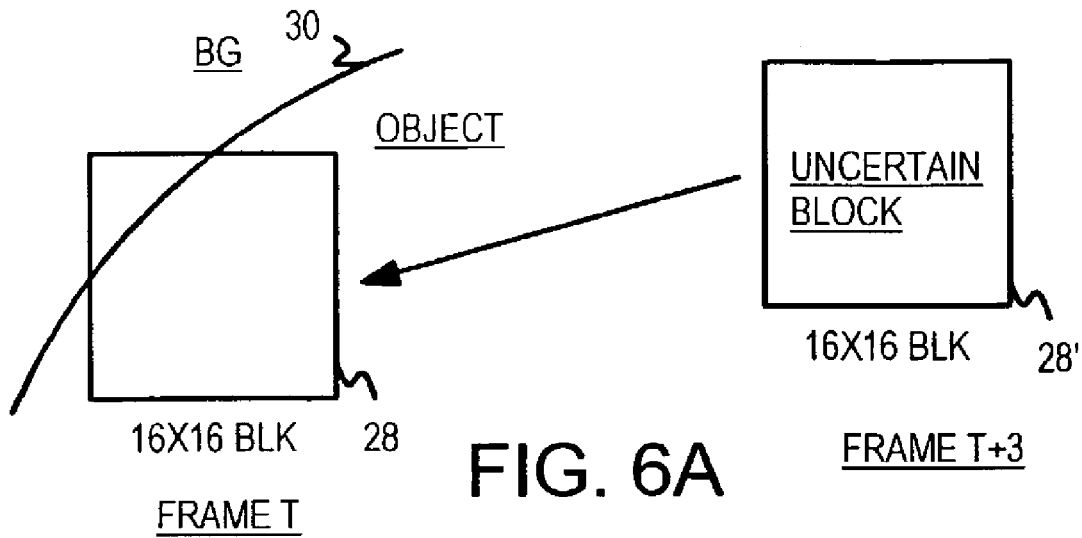
FIGS. 6A–C are an overview of adaptive block matching along the boundary of the object to refine the object mask.
Figure 6B:
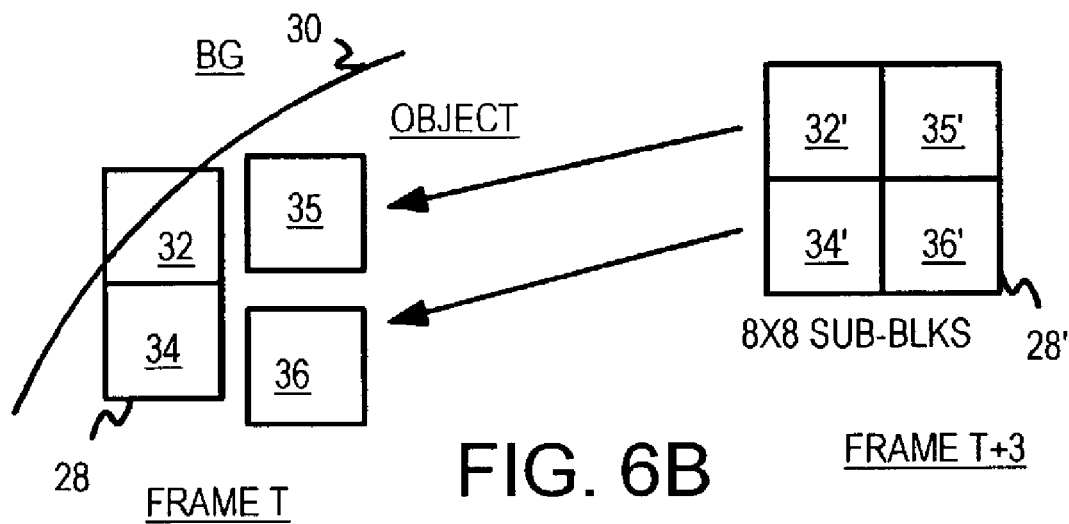
Figure 6C:
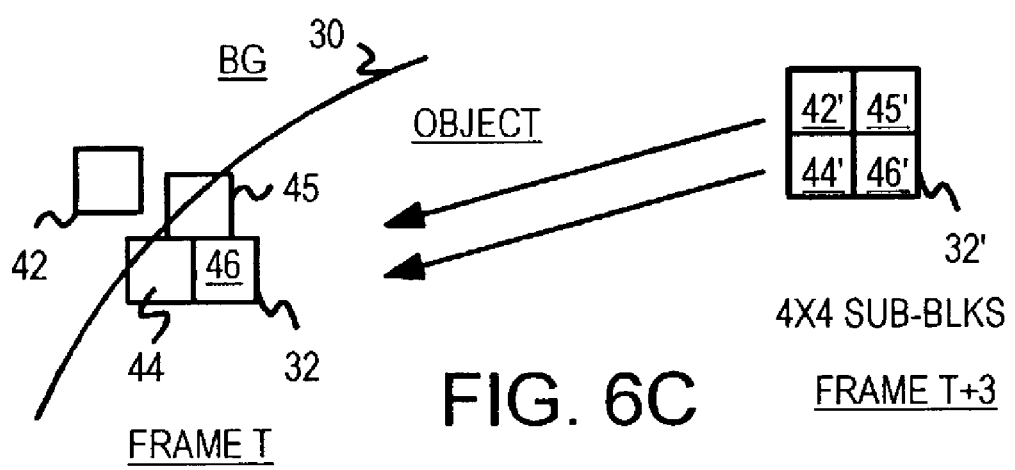

FIGS. 6A–C are an overview of adaptive block matching along the boundary of the object to refine the object mask. Uncertain blocks in frame T+N are further processed to better locate the object boundary for the object mask being constructed for frame T+N. In FIG. 6A, uncertain block 28' in frame T+3 is a 16×16 pixel macroblock. Uncertain block 28' best matches macroblock 28 in frame T. Macroblock 28 has the object contour 30 passing through, so macroblock 28 includes both object pixels and background pixels. Uncertain block 28' was marked as uncertain in earlier processing (FIG. 5A) because its best-matching block 28 had object contour 30 passing through.

In FIG. 6B, uncertain block 28' in frame T+3 is sub-divided into four 8×8 pixel sub-blocks 32', 34', 35' 36'. Motion estimation is repeated for these four sub-blocks. For each sub-block, a search is performed in frame T for the best-matching 8×8 sub-block. Sub-block 32' has matched sub-block 32 in frame T, while sub-blocks 34', 35', 36' in frame T+3 have best matches with sub-blocks 34, 35, 36 in frame T. Most of these matching sub-blocks are not exactly aligned with macroblock 28.

The search range can be significantly restricted to reduce errors, such as by limiting the search range to just 16×16 pixels, or just the adjacent macroblocks. The smaller blocks have fewer pixels, so they tend to match more blocks, resulting in errors from aliasing. Limiting the search range reduces these errors.

Best-matching sub-blocks 34, 35, 36 do not have object contour 30 passing through them, so they can be marked or categorized as certain sub-blocks. Since they are within object contour 30, their matching sub-blocks 34', 35', 36' in frame T+3 can be added to the object mask for frame T+3. Any sub-blocks outside object contour 30 can be categorized as background sub-blocks.

Best-matching sub-block 32 has object contour 30 passing through it. Sub-block 32' in frame T+3 is categorized as an uncertain sub-block and can be further processed to better locate the object boundary.

Figure 8:
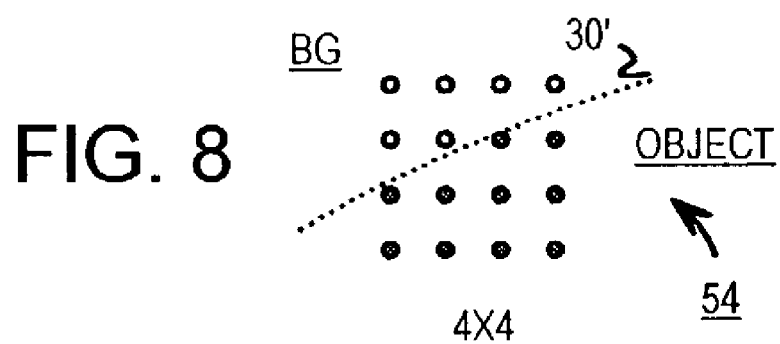
FIG. 8 shows an uncertain 4×4 sub-block with the object contour copied into it.

In FIG. 6C, 8×8 sub-block 32' is further sub-divided into four 4×4 pixel sub-blocks 42', 44', 45', 46'. Motion estimation is again repeated for these four sub-blocks. For each sub-block, a search is performed in frame T for the best-matching 4×4 sub-block. The search range is greatly restricted to prevent aliasing errors.

Sub-block 42' has matched sub-block 42 in frame T, which is outside of object contour 30. Thus sub-block 42' is a background sub-block. Sub-block 46' has matched sub-block 46 in frame T, which is inside object contour 30. Sub-block 46' is a certain sub-block and can be added to the object mask for frame T+N.

Sub-blocks 44', 45' in frame T+3 have best matches with sub-blocks 44, 45, in frame T. Object contour 30 passes through sub-blocks 44, 45, so sub-blocks 44', 45' are still uncertain. However, since the 4×4 size is the smallest block size, further dividing of the uncertain 4×4 is prevented. Instead, the contour information for best-matching sub-block 44 is copied to sub-block 44' in frame T+3. Also, the contour information for best-matching sub-block 45 is copied to sub-block 45'. This contour information may be coded in a variety of ways, such as a matrix of bits representing the 16 pixels in the sub-block, with the bit set to indicate the pixel is within the object, and cleared to indicate the pixel is in the background in the object mask.

Figure 7:
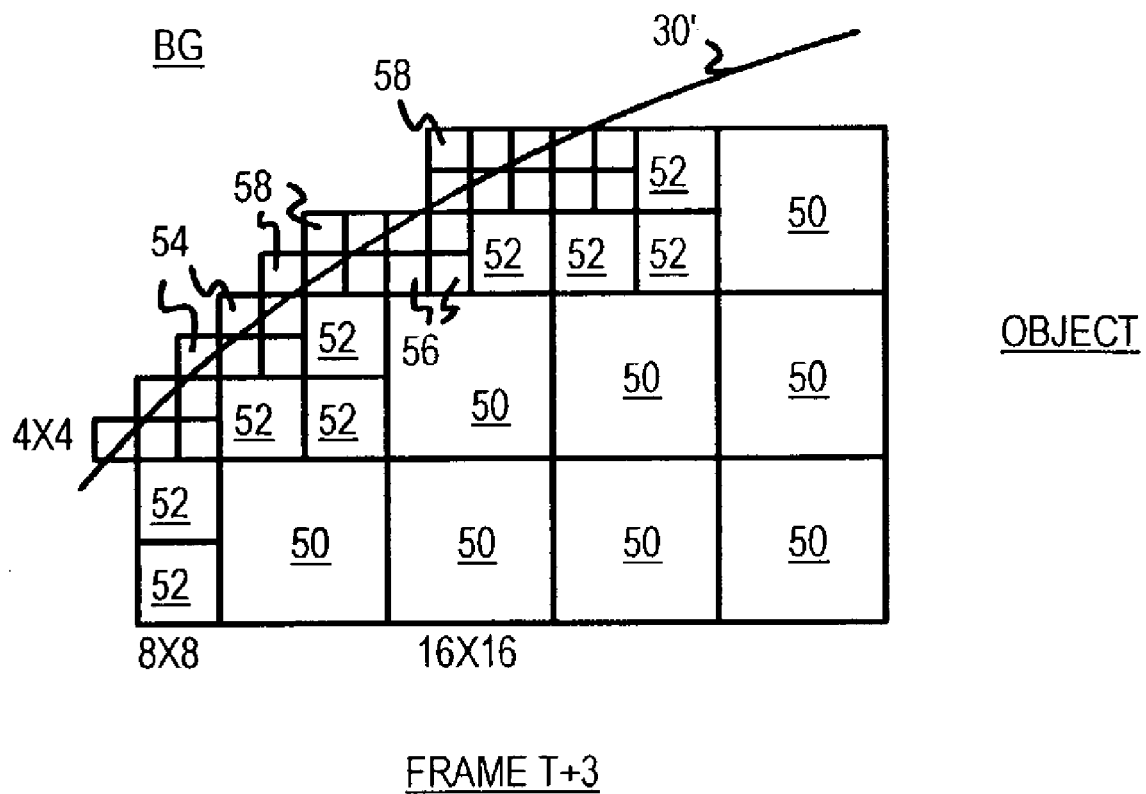
FIG. 7 highlights block-splitting along the object boundary to refine the object mask.

FIG. 7 highlights block-splitting along the object boundary to refine the object mask. The object mask is being constructed for frame T+3. First the 16×16 macroblocks are matched to macroblocks in frame T, and certain macroblocks 50 are identified and added to the object mask.

Uncertain macroblocks are sub-divided into 8×8 sub-blocks, and the sub-blocks searched for matches in frame T. When the matches are entirely within the object contour in frame T, the sub-blocks in frame T+3 are certain 8×8 sub-blocks 52 and can be added to the growing object mask.

Finally, the uncertain 8×8 sub-blocks that had matches along the object contour in frame T are themselves sub-divided into 4×4 sub-blocks. Motion estimation is repeated for these 4×4 sub-blocks. When the matches are within the object contour of frame T, the 4×4 sub-blocks in frame T+3 are marked as certain 4×4 sub-blocks 56 and added to the object mask. When matches are to 4×4 blocks outside the object contour, the sub-blocks are background 4×4 sub-blocks 58 and are not added to the new object mask.

When a 4×4 sub-block matches a 4×4 pixel region in frame T that has the object contour passing through, such as uncertain 4×4 sub-blocks 54, the location of the object contour within the matching 4×4 pixel region is copied to the 4×4 sub-block in frame T+3. The pixels within the object contour are added to the object mask for frame T+3.

The new object contour 30' can be constructed as the perimeter of the new object mask. The new object mask is the combined area of certain macroblocks 50, certain 8×8 sub-blocks 52, certain 4×4 sub-blocks 56, and the pixels within the object in uncertain 4×4 sub-blocks 54.

FIG. 8 shows an uncertain 4×4 sub-block with the object contour copied to it. Uncertain 4×4 sub-block 54 includes background pixels (shown clear in FIG. 8) above new object contour 30' and object pixels (shown dark in FIG. 8) below new object contour 30'. The pixels can each be marked as being within the object by setting or resetting a bit, or by other means such as using a matrix or equation to describe the locations of pixels within the object in uncertain 4×4 sub-block 54. An equation or register value could also be used to identify the location of new object contour 30', and this contour could be restricted to a subset of the possibilities, such as by allowing only full lines or rows to be selected as the boundary rather than diagonals.

Figure 9:
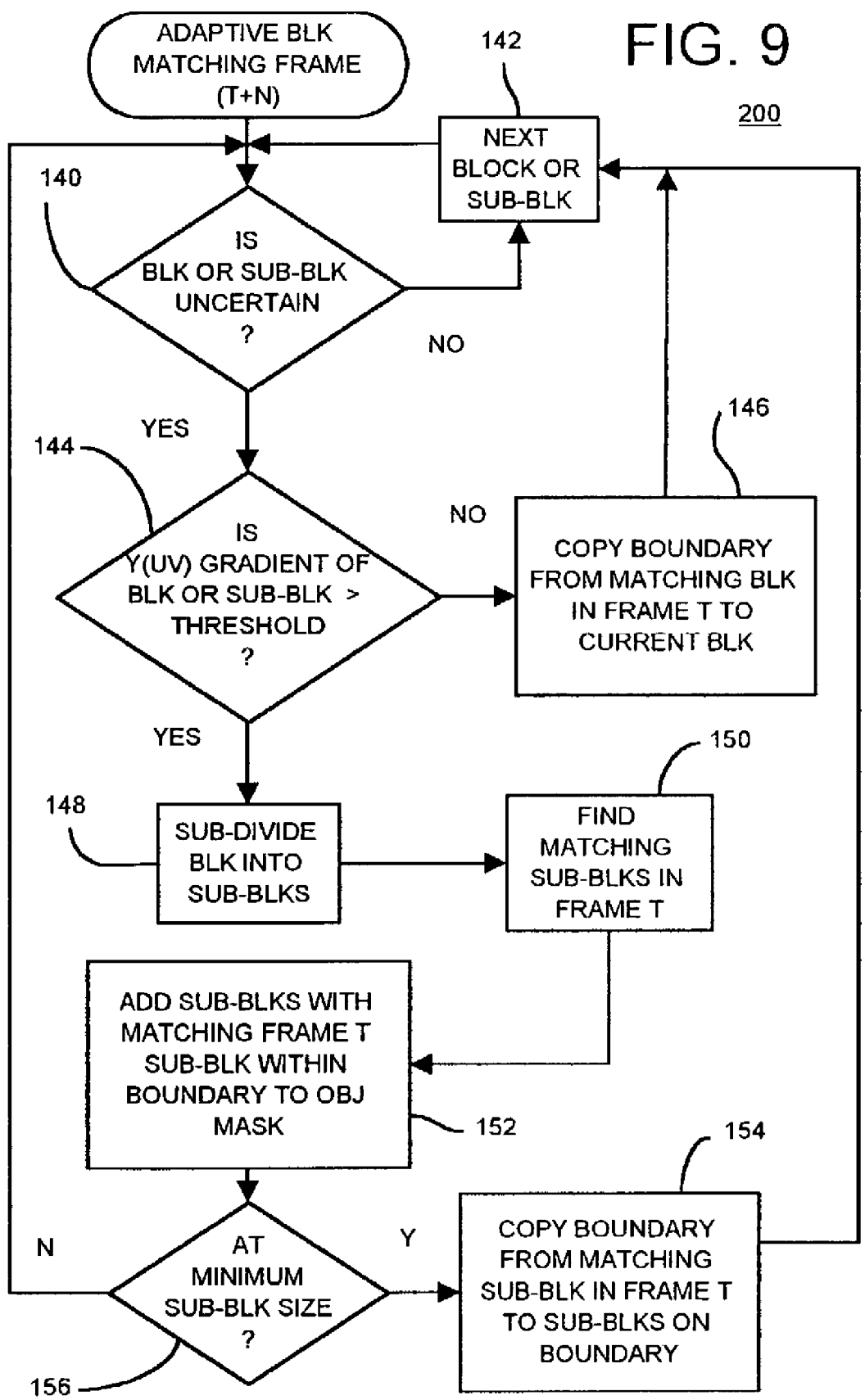
FIG. 9 is a flowchart detailing adaptive block matching along the object boundary.

FIG. 9 is a flowchart detailing adaptive block matching along the object boundary. Adaptive block matching 200 refines the boundary of the object mask in the new frame T+N. Macroblocks can be selected in a sequence and each examined to determine if it is an uncertain block, step 140. When the block is not an uncertain block, the next macroblock is examined, step 142, until all uncertain blocks in frame T+N have been processed. Rather than checking all blocks in frame T+N in a search for uncertain blocks, all uncertain blocks in a list of uncertain blocks could be processed.

In one embodiment, dividing of blocks is stopped when the brightness (luminance) or color (chrominance) of a block is relatively uniform. The gradient of YUV or just Y is a measure of the uniformity of color and brightness, respectively. The Y gradient of the block is measured and compared to a gradient threshold, step 144. When the gradient is below the gradient threshold, the block is relatively uniform in brightness. Further sub-dividing of the block is halted. Instead the object contour is copied from the matching block of frame T to the block in frame T+N, step 146. The contour information is copied even when the block is a larger 8×8 or 16×16 block.

Halting block dividing when the gradient is small helps to minimize errors. When the block's gradient is small and the color or brightness is uniform, the pixels often can match many other blocks since there is little uniqueness in the block's pattern that can be matched. This lack of a larger gradient and a distinct pattern can cause aliasing errors because the low-gradient block may not produce accurate matches during motion estimation.

Often the edge of an object has a sharp change in color or brightness, while blocks within an object or in the background have a relatively uniform color or brightness. Thus the color or brightness gradient across a block is an indication of whether the object boundary passes through the object. Thus a secondary reason to halt further dividing of a block with a low gradient is because the block may not really contain the object boundary.

When a sufficiently large gradient is found within the block, step 144, the block is divided into smaller sub-blocks, step 148. For example, a 16×16 macroblock can be divided into four 8×8 sub-blocks, while an 8×8 block can be divided into four 4×4 sub-blocks. Dividing into other size blocks or regions such as triangles could also be substituted.

The newly-divided sub-blocks in frame T+N are then each motion estimated. A restricted search range in frame T helps to reduce aliasing errors that can arise from the reduced number of pixels in the smaller sub-block. The best-matching sub-block in frame T+N is found for each of the new sub-blocks, step 150. When the matching sub-block is within the object contour of frame T, the sub-block in frame T+N is added to the object mask being refined for frame T+N, step 152.

Sub-blocks that are uncertain (containing the object boundary) are further processed. When these sub-blocks are already at the minimum block size, such as 4×4, step 156, then the object contour information is copied from the matching sub-block in frame T to the sub-block in frame T+N, step 154. Processing of that sub-block ends and the next block or sub-block can be selected, step 142.

When the sub-block is not at the minimum block size, step 156, then it is checked to see if it is an uncertain sub-block, step 140. The gradient of uncertain sub-blocks can be checked, step 144, and the contour copied when the gradient is too small, step 146. For sub-blocks with a sufficiently large gradient, step 144, the sub-block can be further subdivided, step 148, and motion estimation repeated on the smaller sub-block, step 150.

Sub-blocks having matches within the object contour are certain sub-blocks and added to the object mask, step 152, while uncertain sub-blocks can be further subdivided if not yet at the minimum block size, step 156. When these sub-blocks are already at the minimum block size, such as 4×4, step 156, then the object contour information is copied from the matching sub-block in frame T to the sub-block in frame T+N, step 154. Processing of that sub-block ends and the next block or sub-block can be selected, step 142.

Figure 10:
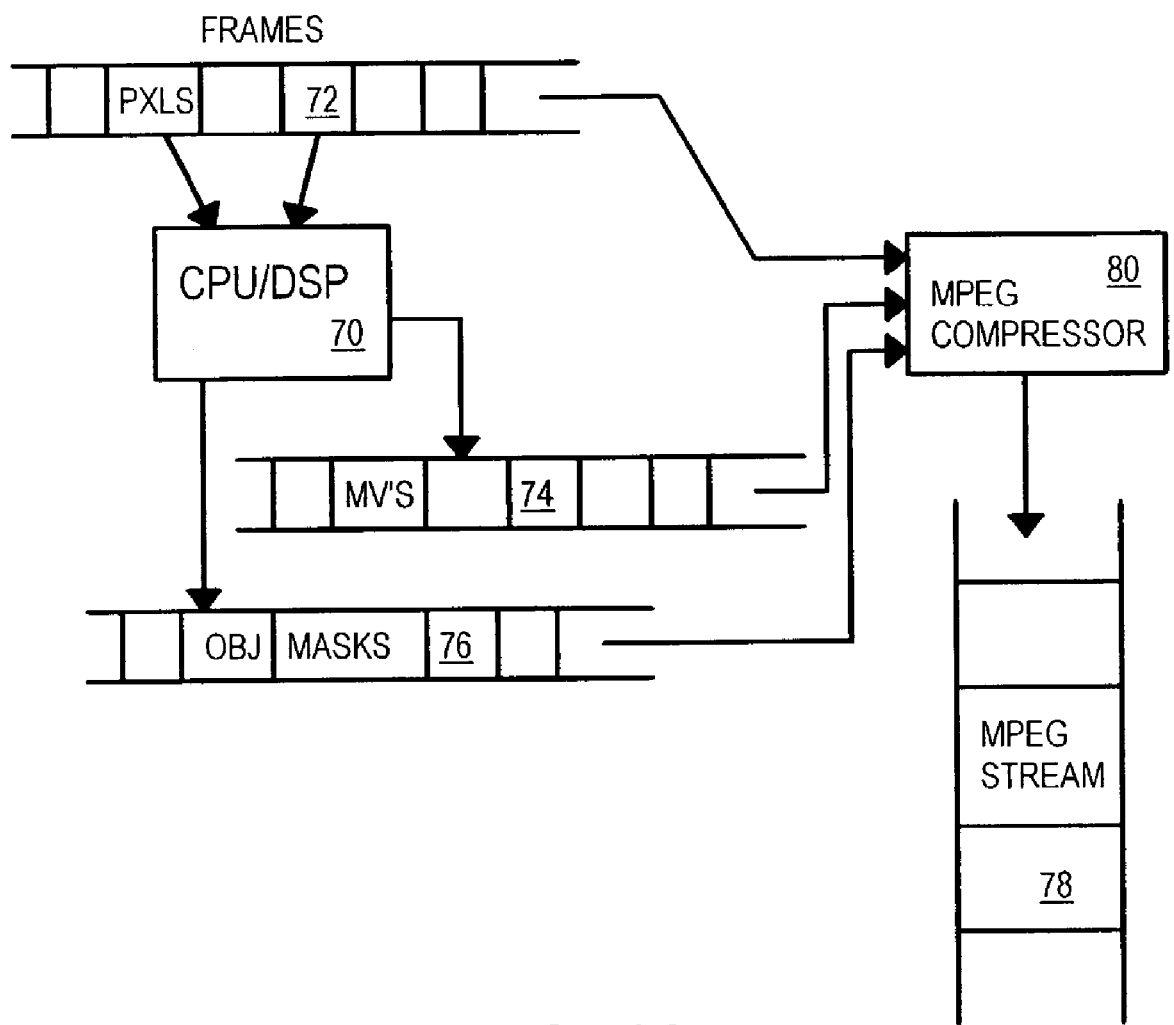
FIG. 10 is a diagram of object tracking used within a video compressor.

FIG. 10 is a diagram of object tracking used within a video compressor. The object tracking and contour generator described above can be part of a larger system for compressing video. Input frames 72 in a video stream are input to processor 70, which can be one or more central processing units (CPU), microprocessors, array processors, or digital-signal processors (DSP). Motion estimation is performed by processor 70 on a frame T+N by comparison with an earlier frame T of input frames 72. The resulting motion vectors are stored as motion vectors 74 for motion between frames T and T+N. The parameter N can be modulated to enhance object tracking accuracy during periods of high motion.

The uncertain blocks along the object boundary are refined by processor 70 using adaptive block matching. Sub-block motion vectors for these blocks along the object boundary can be written to motion vectors 74. The resulting object mask for frame T+N is written to object masks 76, which contain object masks for frames such as frames T and T+N. The object mask and motion vectors may not be available for skipped frames such as T+1, T+2, . . . T+N−1. These skipped frames may be interpolated, or processor 70 or compressor 80 or another processor may generate the missing motion vectors and object masks.

MPEG compressor 80 receives motion vectors 74 and object masks 76, as well as initial or reference frames from input frames 72. Object masks 76 can be used by compressor 80 to increase the perceived accuracy of the object by more highly compressing the background than the object in the object mask. MPEG stream 78 is output by compressor 80 and contains motion vectors, block error terms, and reference blocks and frames.

Figure 11:
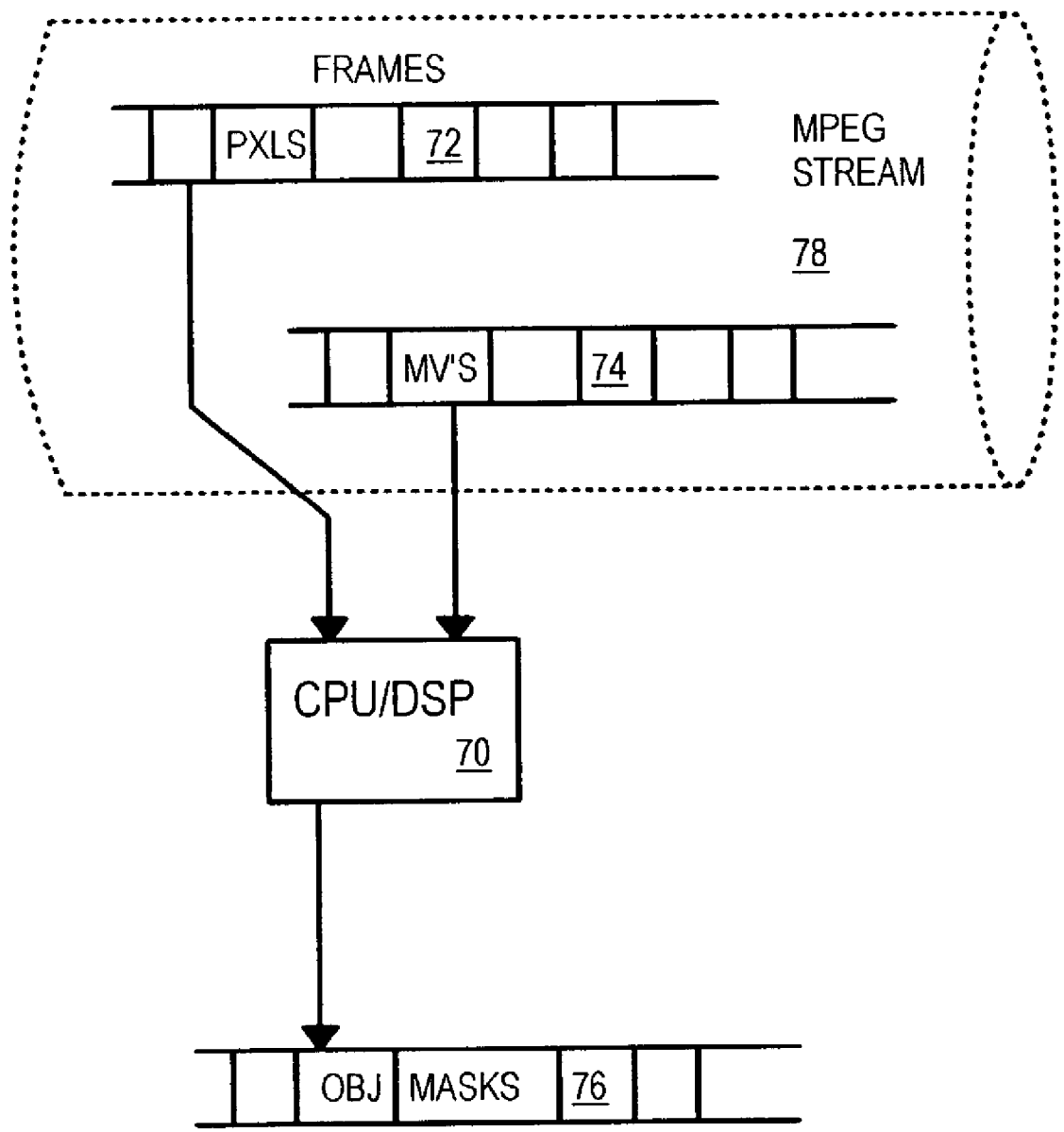
FIG. 11 shows an object tracker operating upon a compressed video input.

FIG. 11 shows an object tracker operating upon a compressed video input. Processor 70 receives MPEG stream 78 as an input, and extracts motion vectors 74 directly from MPEG stream 78. Some initial or reference frames 72 may be available in MPEG stream 78, or may have to be re-constructed by processor 70.

Processor 70 uses the input motion vectors and does not have to perform motion estimation for all macroblocks. Instead the certain blocks can be determined and used for generating the average motion, and adaptive block matching used to refine the object boundary. The final object mask for each frame processed is output to object masks 76.

Parallel processors can be used with the object-tracking methods described herein. Many of the operations that operate on blocks can be performed in parallel, with different parallel processors operating on different blocks. This can significantly speed up processing time to allow for real-time object tracking. Other object tracking methods such as segmentation may require more sequential operations and are less efficiently performed in parallel than block-based methods. The object tracking results can be close to the results of other methods that require ten times as much computational load.

Affine Model for Average Motion Vector

The motion threshold can be a set of maximum X and Y values, such as 5 pixels in the X direction and 5 pixels in the Y direction. When the average motion vector exceeds either limit, such as (6,2) or (3,7), then high motion is signaled. Alternately, the motion threshold can be a combination of X and Y, such as the hypotenuse Z of a triangle with X and Y sides, where $Z^2=X^2+Y^2$.

An affine model may be used to calculate the average motion vector. The affine model may be more capable of describing object motion since it models not only X and Y motion (translation), but also object rotation, magnification, and shear. The affine model is:

$$\begin{bmatrix} x' \\ y' \\ 1 \end{bmatrix} = A \begin{bmatrix} x \\ y \\ 1 \end{bmatrix} = \begin{bmatrix} a_1 & a_2 & a_3 \\ a_4 & a_5 & a_6 \\ 0 & 0 & 1 \end{bmatrix} \begin{bmatrix} x \\ y \\ 1 \end{bmatrix}$$

where x, y are the coordinates in frame T+N and x', y' are the coordinates in frame T. The affine model parameters are a1, a2, a3, a4, a5, a6, where a3 and a6 correspond most closely to the X and Y translation.

A least-squares method may be used to extract the model parameters from the X and Y values of all certain object blocks:

$$\begin{bmatrix} a_1 \\ a_2 \\ a_3 \end{bmatrix} = \left( \begin{bmatrix} \sum x \\ \sum y \\ 1 \end{bmatrix} \begin{bmatrix} \sum x & \sum y & 1 \end{bmatrix} \right)^{-1} \begin{bmatrix} \sum xx' \\ \sum yx' \\ \sum x' \end{bmatrix}$$

and $$\begin{bmatrix} a_4 \\ a_5 \\ a_6 \end{bmatrix} = \left( \begin{bmatrix} \sum x \\ \sum y \\ 1 \end{bmatrix} \begin{bmatrix} \sum x & \sum y & 1 \end{bmatrix} \right)^{-1} \begin{bmatrix} \sum xy' \\ \sum yy' \\ \sum y' \end{bmatrix}$$

The summations are performed over all certain object blocks in frames T and T+N.

The motion-vector displacement or L1 norm corresponds to the X and Y values or the sum of the absolute values of the a3 and a6 parameters of the affine model. The L2 norm (hypotenuse Z where $Z^2=X^2+Y^2$ or $=a3^2+a6^2$) limit can be larger than separate X and Y limits, such as 7 pixels along the hypotenuse.

The affine model may be further refined such as by using an iterative least-squares approach. The model parameters of the affine model may be iterated (namely a1, a2 ... a6). The basic idea of a parametric model is to model the motion of an object using an equation. In this example the motion vectors for the certain blocks are calculated using block motion matching. These motion vectors can be used to come up with one motion model for the entire object. For example, blocks 50,52,56 and all other blocks in the object have different translational motion vectors. These translational motion vectors map any pixel (x,y) in frame T+3 to pixel (x1,y1) in frame T. Using an affine model to characterize the motion of the object:

$$x_1 = a_1 x + a_2 y + a_3$$

and $$y_1 = a_4 x + a_5 y + a_6$$

Points (x,y) and $(x_1,y_1)$ are known. This provides a set of equations to solve for affine parameters a1, ... a6. This is a least-squares-model fitting.

The above set of equations is over-determined since there are many motion vectors and only six parameters to solve for. Hence only an approximate solution can be found. The solution can be corrupted by some motion vectors that are inaccurate since only a percentage (such as 70%) of the motion vectors might fit the model accurately. The remaining 30% of the motion vectors can be found and then the affine parameters recalculated. These motion vectors (the 30%) are called outliers.

Once the motion model parameters are found, inspection can reveal how accurately the model parameters fit the actual motion vectors. Parameters a1 ... a6 can be inserted into the equation to calculate x1 and y1 using the obtained model parameters. If the obtained x1,y1 is very different from the actual data, then that motion vector can be discarded as an outlier for the calculation of the model parameters.

ALTERNATE EMBODIMENTS

Several other embodiments are contemplated by the inventors. For example, macroblock matching can compare differences in all color components such as YUV or RGB, or can just compare one or two components such as luminance Y. Gradients can likewise be calculated using all components YUV or just Y. Different search ranges and methods can be used when searching for the best-matching macroblock. For example, a diamond-shaped search pattern or a 3-point pattern may be more efficient than exhaustively searching a square region. Different search strategies can be used to further speed up the computation.

The gradient of a block can be defined in a variety of ways, such as the difference between the largest Y value and the smallest Y value, or the standard deviation of Y values in a block, or variance of Y values or color values, or other functions such as an energy function of the gradient. The gradient can be calculated for every pixel in the image. The gradient can be calculated along both the row and the column for every pixel. Since this produces a gradient value for every pixel, the average gradient for the block can be computed from the individual pixel gradients. Two averages can be used, such as an average gradient across the row and an average gradient across the column. These two gradient values can then be summed and divided by the number of pixels to give the average gradient for the block. Entropy or randomness measures can also be used as the gradient when deciding when to halt block dividing.

The direction of the video sequence could be reversed, and forward motion estimation or even bi-directional motion estimation could be substituted for backward motion estimation. Some frames may be forward estimated while others backward estimated. Frames that do not have motion vectors already generated could be skipped when the compression is performed before object tracking, or when a compressed video sequence is used as the input.

The methods may be applied to object tracking on an RGB or YUV-pixel video stream prior to compression by a standard such as MPEG-4. The methods may also be applied to content-retrieval applications using standards such as H.26L. Object tracking requires much less computational load since segmentation and watershed computations do not have to be performed on all frames. Only the very first frame in a long sequence of frames may need to be segmented to locate the object or objects to be tracked. Alternately, when very high motion occurs between two consecutive frames, then re-segmentation can be performed. Re-segmentation can also be performed on scene changes.

Occlusion and dis-occlusion routines can be performed after the object mask is generated to further refine the object contour. Optical flow does not have to be calculated using the motion-vector-based tracking method. Adaptive block size minimizes blocking artifacts, which can otherwise limit the use of block-based methods.

Different numbers of frames can be skipped during modulation. For example, the number of frames before then next object mask is generated, N, can be set to values other than 3, such as 2 or 5 or many other values. Multiple motion thresholds can be used, such as adding a second very-low motion threshold that sets N to 10 while motions above the very-low motion threshold but below the regular threshold set N to 3. The standard value of N=3 could be adjusted depending on the type of video sequence, (bright, dark, cluttered, sparse, interview, TV show, surveillance camera, etc.) or on a test of background or other object motions, or by other means. For example, video conferencing applications may set a larger value of N while medical imaging applications may use a smaller value of N for more accuracy. Adaptive selection of the modulation parameter N could also be preformed dynamically during processing of a video sequence.

Object contours can be line segments along the object perimeter, or pixels along the perimeter, or can be defined in other ways. For example, the area within the contour may be stored as an object mask, either including the perimeter or excluding the perimeter, or all pixels within the object's predicted contour can be stored.

The order of the steps in block categorization can be varied, and further categories can be added, such as certain background and uncertain background, or even several kinds of background or secondary objects. Steps in program or process flows can often be re-arranged in order while still achieving the same or similar results. While the invention has been described in simplified terms as tracking foreground objects, any object may be tracked, whether a foreground or a object. The background may consist of many objects moving in different directions.

It is not necessary to process all macroblocks in frame T+N. For example, only a subset or limited area of each frame could be processed. It may be known in advance that the object only appears in a certain area of the frame, such as a moving car only appearing on the right side of a frame captured by a camera that has a highway on the right but a building on the left. The "frame" may be only a subset of the still image captured by a camera or stored or transmitted.

For the first frame, the user can manually draw a contour around the object, such as by clicking with a mouse at points along the boundary of the desired object. The computer or processor can connect these points to generate the initial contour or object mask. Alternately, an automated method can be used, such as a segmentation or watershed algorithm. A combination may also be used, such as using user inputs to localize the object, then using and automated segmentation method to refine the boundary to more closely fit the object, or the reverse, where segmentation identifies several objects and the user selects one or more of the segmented objects for tracking. A region-merging process can also be added as a post-processing step.

While macroblocks such as 16×16 blocks and 8×8, and 4×4 sub-blocks have been described, other block sizes can be substitutes, such as larger 32×32 blocks, 16×8 blocks, etc. Non-square blocks can be used, and other shapes of regions such as triangles, circles, ellipses, hexagons, etc., can be used as the region or "block". Adaptive blocks need not be restricted to a predetermined geometrical shape. For example, the sub-blocks could correspond to content-dependent sub-objects within the object. Smaller block sizes can be used for very small objects for motion estimation and generating the average motion. Models other than the affine model may be substituted or simple averages used.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line. Program code to perform the methods described may be partitioned or combined in a variety of ways and may be implemented in firmware, software, hardware, or a combination thereof.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. An object tracker comprising:
a motion estimator, receiving an object location in a base frame, for generating motion vectors representing displacements from regions in a current frame to best-matching regions in the base frame;

a motion averager, receiving motion vectors from the motion estimator for regions that match best-matching regions that are within the object location in the base frame, for generating an average object motion from motion vectors for regions matching best-matching regions that are within the object location but excluding motion vectors for regions matching best-matching regions that are outside the object location or not entirely within the object location when generating the average object motion;

a motion thresholder, receiving the average object motion from the motion averager, for comparing the average object motion to a motion threshold and adjusting a frame skipping parameter to skip frames between the base frame and the current frame when the average object motion exceeds the motion threshold, but not skipping frames and processing sequential frames when the average object motion is below the motion threshold;

an adaptive region-size motion estimator, for sub-dividing regions in the base frame into sub-regions for regions matching best-matching regions that are partially within the object location, for generating motion vectors representing displacements from sub-regions in the current frame to best-matching sub-regions in the base frame; and an object-location generator, coupled to the adaptive region-size motion estimator, for generating a current object location for the current frame by including regions matching best-matching regions that are within the object location and including sub-regions matching best-matching sub-regions that are within the object location, whereby frame skipping is modulated based on motion of regions matching within the object location and whereby adaptive region-size matching along a boundary of the object location in the base frame refines the object location in the current frame.

2. The object tracker of claim 1 wherein the adaptive region-size motion estimator continues to sub-divide sub-regions into smaller sub-regions for sub-regions in the current frame best matching sub-regions in the base frame that are partially within the object location, whereby sub-regions along the boundary of the object location are further sub-divided to more precisely refine the boundary of the object location.

3. The object tracker of claim 2 further comprising:

a gradient calculator for generating a gradient within a sub-region and for comparing the gradient to a gradient threshold, the gradient calculator preventing the adaptive region-size motion estimator from further sub-dividing a sub-region when the gradient of the sub-region is below the gradient threshold, whereby sub-dividing of low-gradient sub-regions is halted.

4. The object tracker of claim 3 wherein the gradient is generated from a luminance value or chrominance values of pixels within the sub-region, the gradient being a maximum difference or an average or a variance or a standard deviation of the luminance value or the chrominance values or both luminance and chrominance values.

5. The object tracker of claim 4 further comprising:

a contour copier, coupled to the adaptive region-size motion estimator, for copying a boundary of the object location to a sub-region in the current frame that best matches a sub-region in the base frame that includes the boundary of the object location in the base frame;

wherein the object-location generator includes the boundary copied for sub-regions that best match sub-regions falling along the boundary of the object location.

6. The object tracker of claim 1 wherein the regions are blocks of pixels or triangular regions of pixels, and wherein each regions is sub-divided into at least four sub-regions.

7. The object tracker of claim 1 wherein the regions are macroblocks each having 16 by 16 pixels.

8. A computer-implemented method for generating a new object contour in a current frame of a video from a base frame in the video comprising:

searching for matching base regions in the base frame that approximately match with current regions in the current frame;

determining when a matching base region is entirely within an object contour of the base frame and categorizing a matching current region in the current frame as a certain region;

determining when the object contour passes through the matching base region of the base frame and categorizing a matching current region in the current frame as an uncertain region;

for uncertain regions in the current frame, sub-dividing the region into a plurality of sub-regions that are each smaller than the uncertain region;

searching for matching base sub-regions in the base frame that approximately match with current sub-regions in the current frame;

determining when a matching base sub-region is entirely within the object contour of the base frame and categorizing a matching current sub-region in the current frame as a certain sub-region;

determining when the object contour passes through the matching base sub-region of the base frame and categorizing a matching current sub-region in the current frame as an uncertain sub-region; and generating the new object contour to include areas of certain regions and areas of certain sub-regions in the current frame, whereby regions along an object boundary are sub-divided to refine the new object contour.

9. The computer-implemented method of claim 8 further comprising: for uncertain sub-regions, reading boundary information that indicates a precise location of the object contour within a matching base sub-region;

copying the boundary information from the matching base sub-region to the matching current sub-region, and using the boundary information copied to the matching current sub-region to refine the new object contour, whereby boundary information copied for uncertain sub-regions refines the new object contour.

10. The computer-implemented method of claim 9 further comprising:

for uncertain sub-regions in the current frame larger than a minimum sub-region size, sub-dividing the sub-region into a plurality of sub-regions that are each smaller than the uncertain region, whereby sub-regions are sub-divided until the minimum sub-region size is reached.

11. The computer-implemented method of claim 10 further comprising:

generating a gradient for a sub-region from pixel values within the sub-region;

comparing the gradient to a gradient threshold; and when the gradient does not meet the gradient threshold, halting sub-dividing of the sub-region, whereby sub-regions with insufficient pixel gradients are not sub-divided.

12. The computer-implemented method of claim 8 further comprising:

for all certain regions, generating a motion vector representing a relative difference in locations of the matching current region and the matching base region;

combining motion vectors for all certain regions to generate an average motion vector;

comparing the average motion vector to a motion threshold; and reducing a number of frames skipped between the base frame and the current frame when the average motion vector exceeds the motion threshold and repeating searching for matching base regions for a new current frame that is closer to the base frame, whereby a number of frames between the base frame and the current frame is modulated for different pairs of base and current frames in a video sequence.

13. The computer-implemented method of claim 8 further comprising:

after the new object contour is generated, incrementing the base frame to the current frame and selecting a new current frame that is more than one frame ahead of a prior current frame;

wherein the computer-implemented method is repeated for a new base frame and the new current frame.

14. The computer-implemented method of claim 8 further comprising:

using an affine model to combine motion vectors for all certain regions to generate an average motion vector.

15. A computer-program product comprising:

a computer-usable medium having computer-readable program code means embodied therein for tracking an object boundary in a video stream, the computer-readable program code means in the computer-program product comprising:

motion estimation means for generating motion vectors for blocks of pixels in a current frame relative to a base frame;

base-frame block-boundary compare means for comparing a location of a matching block in the base frame to an object boundary in the base frame;

block categorization means, coupled to the base-frame block-boundary compare means, for identifying a current block in the current frame that has a motion vector to a matching block in the base frame as:

(1) a certain block when the matching block is located completely within the object boundary in the base frame;

(2) an uncertain block when the matching block is located partially within the object boundary but partially outside the object boundary in the base frame;

adaptive block-size match means, coupled to receive the uncertain blocks, for splitting an uncertain block into a plurality of sub-blocks in the current frame;

sub-block motion estimation means for generating motion vectors for the sub-blocks of pixels in the current frame relative to the base frame;

base-frame sub-block-boundary compare means for comparing a location of a matching sub-block in the base frame to the object boundary in the base frame;

sub-block categorization means, coupled to the base-frame sub-block-boundary compare means, for identifying a current sub-block in the current frame that has a motion vector to a matching sub-block in the base frame as an uncertain sub-block when the matching sub-block is located partially within the object boundary but partially outside the object boundary in the base frame;

new object boundary means, coupled to the sub-block categorization means, for generating a new object boundary for the current frame, the new object boundary being drawn through the uncertain sub-blocks to surround the certain blocks; and advancing frame means for advancing the video stream to select a next current frame and a next base frame, the next base frame having an object boundary already computed but the next current frame not yet having an object boundary computed, whereby object boundaries are generated by categorizing matching blocks linked by motion vectors and by splitting uncertain blocks on the object boundary into smaller blocks.

16. The computer-program product of claim 15 wherein the motion estimation means generates motion vectors by searching for a best-fit matching block in the base frame that best matches pixels in the block in the current frame;

wherein the best-fit matching block searched for in a limited range of the base frame;

wherein the sub-block motion estimation means generates motion vectors by searching for a best-fit matching sub-block in the base frame that best matches pixels in the sub-block in the current frame;

wherein the best-fit matching sub-block searched for in a limited sub range of the base frame;

wherein the limited sub range is smaller than the limited range, whereby motion estimation search ranges are reduced for sub-blocks.

17. The computer-program product of claim 16 wherein the blocks are arbitrarily-shaped regions of uniform size or are rectangular macroblocks or triangle-shaped regions.

18. The computer-program product of claim 15 wherein the computer-readable program code means comprises:

average motion means, coupled to the motion estimation means, for generating an average motion by combining motion vectors for certain blocks but not including motion vectors for uncertain blocks or for sub-blocks; and modulation means, coupled to receive the average motion from the average motion means, for causing the advancing frame means to select as a next current frame a next sequential frame after the base frame when the average motion exceeds a threshold, but for selecting as the next current frame a frame several frames separated from the base frame when the average motion does not exceeds the threshold, whereby frame advancement is modulated based on average motion of the certain blocks.

19. The computer-program product of claim 18 wherein the computer-readable program code means comprises:

segmentation means, coupled to the average motion means, for segmenting the base frame to determine the object boundary when the base frame is an initial frame in a video scene, or when the base frame and the current frame are sequential frames and the average motion still exceeds the threshold, whereby segmentation to re-initialize the object boundary is performed for new video scenes or for large motions between sequential frames.

* * * * *